US005096163A

United States Patent [19]

Swearingen

[11] Patent Number: 5,096,163

[45] Date of Patent: Mar. 17, 1992

[54] WIRE GUIDE APPARATUS

[76] Inventor: Gary V. Swearingen, 309 Arlington St., Whiteland, Ind. 46684

[21] Appl. No.: 652,011

[22] Filed: Feb. 7, 1991

[51] Int. Cl.$^5$ .......... E21C 29/16

[52] U.S. Cl. .......... 254/134.3 R

[58] Field of Search .......... 254/134.3 FT, 134.3 R, 254/134.3 PA; 269/45

[56] References Cited

U.S. PATENT DOCUMENTS

| | | | |
|---|---|---|---|
| 1,313,067 | 8/1919 | Brown | 269/45 |
| 3,072,382 | 1/1963 | Jones | 254/139.3 R |
| 3,223,384 | 12/1965 | Gebo | 254/134.3 FT |
| 3,291,449 | 12/1966 | Hughes | 254/134.3 FT |
| 4,337,924 | 7/1982 | Gebo | 254/134.3 R |

*Primary Examiner*—Robert C. Watson
*Attorney, Agent, or Firm*—Robert A. Spray

[57] ABSTRACT

A guide facilitating the guiding of wire or cable into or out of conduit already attached to the structure being provided with a conduit installation.

The guide device, adjustable in several respects, avoids the damage to wire installation as the wire is forced to sharply bend at the location of the wire-guiding procedure such as the junction of a box wall and the end of the attached conduit, and avoids the damage to the wire or cable as it is forced past the sharp edge of the conduit or edges of a connector body which attaches the conduit to an electric junction box.

13 Claims, 4 Drawing Sheets

WIRE GUIDE APPARATUS

I. FIELD OF THE INVENTION

The present invention relates to electric cable or wire installations, and more particularly to the task of guiding wire or cable into or out of a conduit or raceway with or without an electric box which is already installed onto a framing piece of a house or other structure.

Whenever (as seems to be often the case) the wire is not co-axial as to its path at both sides of the location of the conduit or raceway end, the forcing of the wire to accept a sharp bend has had the particular problem of a scraping of the wire against the sharp corner edge of the box-opening or against the sharp edge of the end of the conduit. This scraping is often harmful to the insulation of the wire, and is particularly an undersirable problem because the inherent nature of the procedure acts to conceal the damage, for the damaged wire feeds into or out of conduit which is non-transparent. Also, the sharp bend of wire travel causes high friction at the location of the conduit or raceway opening.

This invention, accordingly, advantageously minimizes the chance of the damaging of the wire or cable, yet provides labor-saving economy by maximizing the overcoming or avoidance of need for a workman to position himself adjacent the site of the cable entering or exiting a conduit.

II. SUMMARY OF THE INVENTION

The invention provides a wire guiding device for use in guiding wire or cable into or out of hollow conduit, for example, into and through an electric junction box or switch box having attached and protruding therefrom the conduit or raceway into which wire or cable is to be guided.

The invention is characterized by a guide body having a smooth surface for guiding the wire or cable past the sharp edges of the open end of the conduit and/or the connection body edge, and accept the sharp bend of the wire or cable as its direction is forced to change at the electric box or wherever is the site of the open conduit end.

The guide in the preferred embodiment has a roller; and the overall assembly includes not only the guide body which carries the roller but also several carrier components which are relatively and adjustably movable so as to be able to present the guide roller very close to the sharp edge of the conduit or raceway, or of a connector body, depending on particulars of the installation, herein illustrated as a connector of conduit to a junction box (although since a connector body is affixed to the conduit and thus becomes an extension of the conduit, for brevity this description considers a connector, a conduit, and a raceway interchangeably unless otherwise indicated).

(Also for brevity, it is here mentioned that the words "wire" or "cable" are considered to be interchangeable.)

Thus understood, it is emphasized that the present invention relates to the device for the task of guiding the wire co-axially with whatever is the associated receiver of the wire, the device including the means supporting the device's component which touches the wire in the wire-guiding procedure, and means of support by the provision of an attaching component which is attachable to existing conduit or other stable support; and the great adjustability of the carrier members accommodates an attachment to conveniently-available support yet sill get the roller close to its desired position.

A second embodiment, for smaller boxes such as switch boxes, provides a jamming bolt by which the roller's guide body holds the roller in its desired location by jamming the jamming bolt against a wall of the box.

III. THE PRIOR ART HELPS SHOW PATENTABILITY HERE

In a hindsight consideration of the present invention to determine its inventive and novel nature, it is not only conceded but emphasized that the prior art had details usable in this invention but only if the prior art had had the guidance of the present concepts of the present invention.

That is, it is emphasized that the prior art had/or knew several particulars which individually and accumulatively show the non-obviousness of this combination invention:

a. The prior art has long had mechanisms of various types which support moving work objects;

b. The prior art knew the advantages of careful and protective handling of work objects;

c. The prior art has long had the problem of installation of wires or cables into conduit;

d. The prior art has long known of the cost of damaged cables; and e. The prior art has realized the desire to avoid unnecessary labor costs.

In spite of all such factors of the prior art, the problem here solved awaited this inventor's creativity. More particularly, as to the novelty here of the invention as considered as a whole, a contrast to the prior art helps show its contrast to the present concepts, and emphasizes the advantages and the inventive significance of the present concepts as are here shown, and the nature of the concepts and their results can perhaps be easier understood.

Even further as indicating the inventive nature of the present concepts is the result of a Preliminary Patentability Search made in the Search files of the U.S. Patent Office, after this invention was made, and during the course of considering the desire and likelihood of patent protection.

The Search produced the following, all U.S. Patents:

| | | |
|---|---|---|
| 4,358,089 | Metcalf | 1982 |
| 4,456,225 | Lucas | 1984 |
| 4,541,615 | King, Jr. | 1985 |

However, these references fail to show or suggest the details of the present concepts, and a realistic consideration of their several differences from the present concepts may more aptly be described as teaching away from the present invention's concepts, in contrast to suggesting them, even as to a hindsight attempt to perceive suggestions from a backword look into the prior art.

AS TO METCALF

The Metcalf device is intended to be used on only a junction box, or an object with such limited dimensions that the clamp could fit into a junction box; and its attempted use as clamped outwardly of a junction box does not provide an adequate wire guiding function, as noted in Metcalf's FIG. 1 which shows that Metcalf's guide pulley wheel 12 cannot be adjusted so that path 34 can be aligned with conduit tube 36 to avoid the wire-bending resistance avoided by the present invention.

AS TO LUCAS

The complex Lucas device shows no concept of a wire guide for the guidance of wire into a conduit or raceway, for the Lucas device is a wire-pulling mechanism, with a use of pulley wheels only in the function of avoiding too sharp a bend of the wire being pulled, and with the slope direction of the wire depending solely upon where the power winch's capstan is located.

Also, Lucas differs from the present invention by Lucas not having guidance a primary concept of the present invention; i.e., Lucas has no wire guide easily attached to whatever is a conveniently located support member which provides the sole support and positioning of the wire guide features.

AS TO KING, JR.

Without the present invention's wire-guidance concepts the King apparatus very significantly depends on a box having already-existing apertures which are provided in only certain types of electric boxes, or on a screw of the box if the wire travel is out the bottom of the box.

However, there are a large number of other boxes of different sizes or styles that are commonly used, which do not have apertures or screws that could be used for support of this apparatus.

Thus, although the King apparatus may be used for branch circuit wiring, or control wiring, or for other relatively small wire use, the King apparatus could not be made in various sizes to allow the installation of wire or cable of larger sizes into conduits of larger sizes with or without a junction box.

Less remote than those patent references found on the Search is a commercially available Greenlee "Porto Puller" (a device which is believed to be obtainable from Greenlee Tool Co., 2136 12th St., Rockford, Ill. 61101).

However, as criticized in the Lucas patent, cited above, the Greenlee apparatus is quite bulky and difficult to carry, and cannot pull cable around sharp bends. Also, its use is burdened by its nature of requiring the attachment for support of the device to be at a close proximity to the wire passage point of the conduit's wire exit or entry point; and often attachment of the main frame the pulley adjustment is very limited.

The bulkiness of the Greenlee device's main frame makes it awkward, and limits accessability to attachment points of support, which can be quite disadvantageous because of obstructions in the area of the wire or cable guiding function.

Accordingly, although various concepts of installing cable are conceded and emphasized to have been known and used in the prior art, nevertheless, the prior art not having had the particular combination of concepts and details as here presented, and shown as a novel combination or combinations, significantly different from the prior art and its suggestions, even only a fair amount of realistic humility, to avoid consideration of this invention improperly by hindsight, requires the concepts and achievement here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art of all relevant fields.

IV. BRIEF DESCRIPTION OF THE DRAWINGS

The above description of the novel and advantageous invention is of somewhat introductory and generalized form. More particular details, concepts, and features are set forth in the following and more detailed description of illustrative embodiments, taken in conjunction with the accompanying drawings which are of somewhat schematic and diagrammatic nature, for showing the inventive concepts:

FIG. 10 is a fragmental or detail cross-sectional diagram showing the end of the conduit or connector piece being retained by a locknut against the interior wall of a junction box; and FIG. 11 is a fragmental or detail view of the conduit or connector piece and its locking nut.

V. DETAILED DESCRIPTION OF PREFERRED EMBODIMENTS OF THE INVENTION

V.a. A First Embodiment

Figure 1:
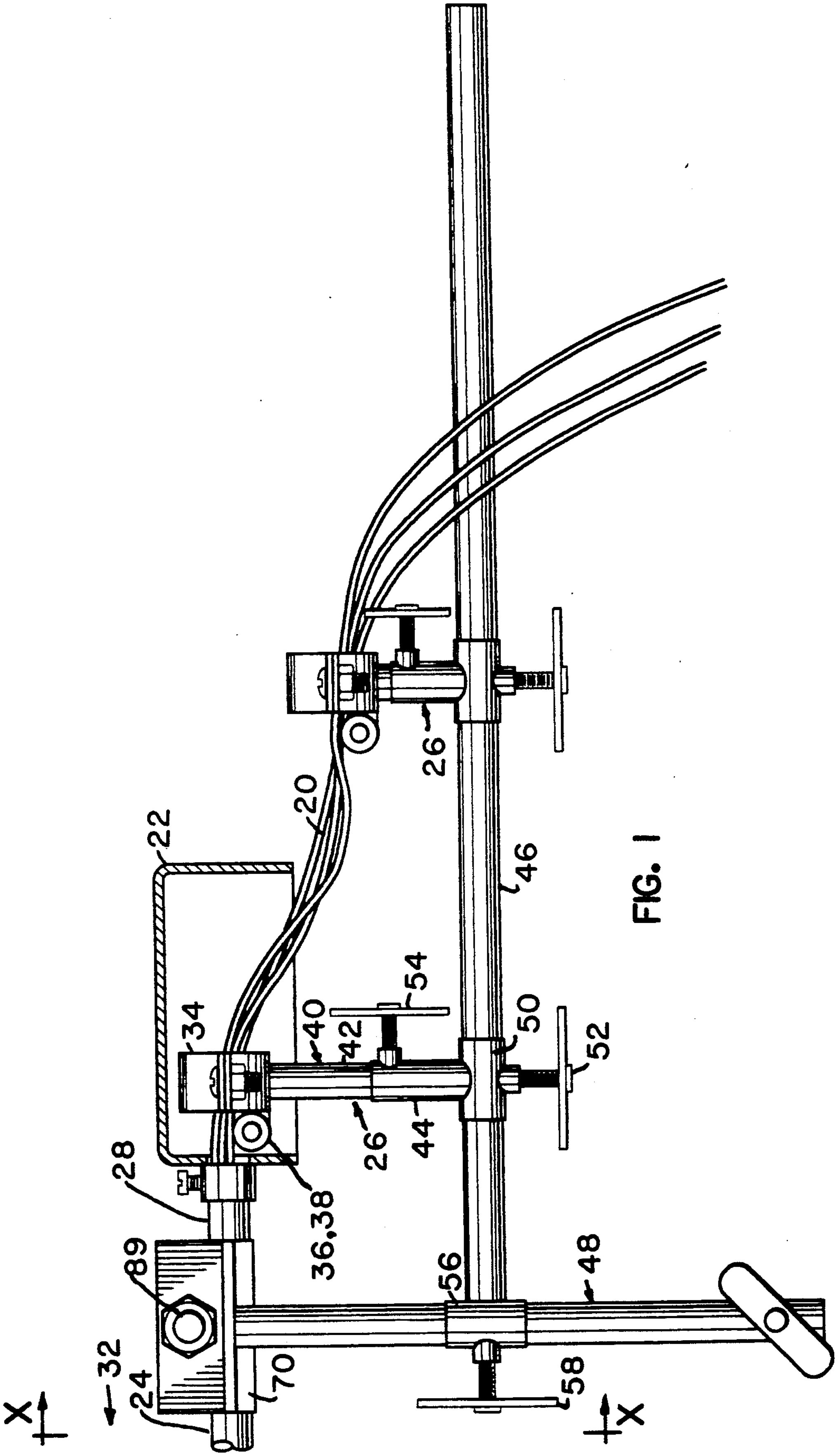
FIG. 1 is a side elevational view of an existing conduit installation illustrating a first embodiment of the invention in use with an existing electric junction box of a conduit system, and with an extra guide body attached to existing conduit, the wire-pull being leftwardly in this view.

In a preferred embodiment, the invention is used and applied to an existing electric conduit system or installation, and illustrated in the drawings as a partially completed conduit system in which cable 20 is to be passed through a junction box 22 and into conduit 24 which is connected to the box 22.

Thus, as illustrated in the drawings, there is shown the existing conduit 24 fixed to an existing electric junction box 22; and the invention provides novel support means, supported only by the conduit 24 itself, for supporting a primary wire guide 26 closely adjacent the end 28 of the conduit 24 at the box 22, and positioned so that it guides the wire 20 generally co-axially with respect to the axis of the existing conduit 24/28.

The invention provides the particular advantage that the passing or incoming wire 20 can be guided into or out of the conduit 24/28 by pulling the wire 20 from the downstream end 32 of the conduit 24 easily and smoothly.

This advantage is achieved by the primary wire guide 26 having a head 34 which has a smooth support surface which prevents the wire 20 from getting its insulation scraped by the often-sharp inner edge 35 of the end-portion 28 of the conduit 24 affixed to the electric box 22, or of the inner wall of the connector 35*a*.

Figure 11:
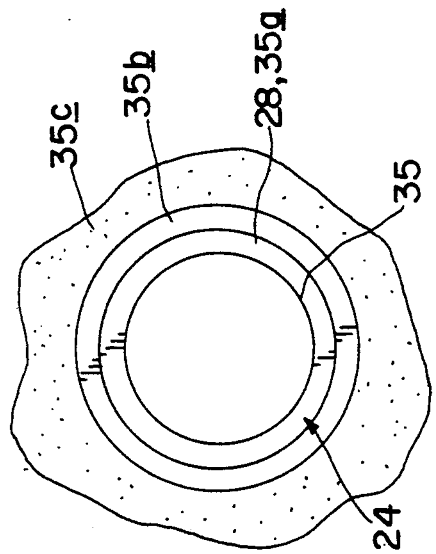
FIGS. 10 and 11 are diagramatic detail views of the parts having an edge which is likely to scrape insulation off the wire or cable, and more particularly.
Figure 10:
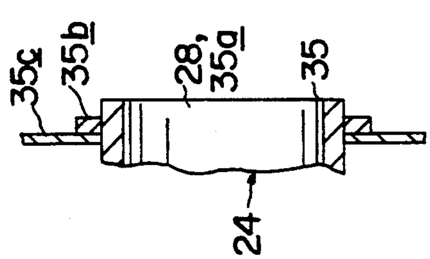

A connector 35*a* is a short bushing, which, like the end 28 of conduit 24, is threaded to receive a locknut 35*b*; and FIGS. 10 and 11 show the conduit 24's end 28 or connector 35*a* held tight to a wall 35*c* of the box 22 by the locknut 35*b*. The connector 35*a*'s end, if a connector is used, lies in the same cylindrical region as the conduit 24 with respect to the axis of conduit 24 and its end 28. Thus, FIGS. 10 and 11 indicate the inner tubular component by the reference 28/35*a*, a proper reference, since (insofar as the present invention is concerned) also it is not material whether or not the conduit 24 here has merely an end 28 or has a connector bushing 35*a* which for all purposes here concerned) becomes a part of the conduit 24/28. And, accordingly, the terms "conduit" or "conduit end" and "connector" are thus used synonomously when referring to the wire-receiving end portion 28 of the conduit 24 adjacent the guide body 26, unless the reference indicates otherwise in referring to the end of the raceway adjacent the wire guide body 26.

Figure 3:
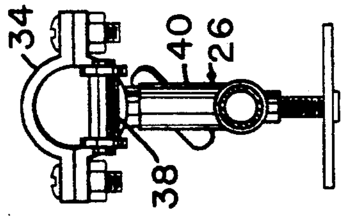
FIG. 3 is a detail view of a guide body per each of the two guide bodies shown in FIG. 1.

The smooth surface 36 in the preferred embodiment is a roller body 38 (see FIGS. 1 and 3) supported by the wire guide head 34, such that the axis of the roller 38 is transverse to the axis of the adjacent end of the conduit 28.

For reference here, the wire guide's head 34 which provides the smooth support surface (roller 38) is referred to as a first body member; and the wire guide 26 is formed to have a support body referred to herein as a second body member 40 for supporting the first body member 38 at a location inside the box 22 as described above, with its smooth surface for guiding the cable 20. Considerable adjustability is provided by forming that support body 40 of two telescoping portions 42 and 44.

Supporting the second body member 40 is a third body member 46 which itself is supported by a fourth body member 48; and great adjustability is achieved, as to the relation of both the second body member 40 as to the third body member 46, and the relation of the third body member 46 to the fourth body member 48.

More particularly in the form shown, the third body member 46 is shown as a long rod or tube, and with a collar 50 carried by the second body member 40 sleeved over the third body member 46, and with a screw-threaded clamp feature 52 (like a set screw) holding any desired adjustment of the third body member 46 rotationally and axially with respect to the second body member 40, the third body member 46 being of circular cross-section, as are the members 40 and 48, accepting rotational adjustment.

A similar clamp feature 54 holds any adjusted relation of the portions 42 and 44 of the second body member 40, relatively rotationally and axially, the portion 42 being of circular cross-section.

Similarly, the fourth body member 48 is adjustably connected to the third body member 46 by a collar 56 movably sleeved around one of the support bars 48, and having a screw-threaded clamp member 58, this connection 58 providing adjustability as in the connections of the supporting assembly of the support tubes 40 and 46.

Quite significantly, the fourth body member 48 (shown in FIG. 2 as comprising two leg pieces 60 and 62) is shown supported (FIGS. 1 and 2) by the conduit 24 itself; and three types of the support factors are shown, by which the fourth support member 48 is itself supported by the conduit 24.

Figure 2:
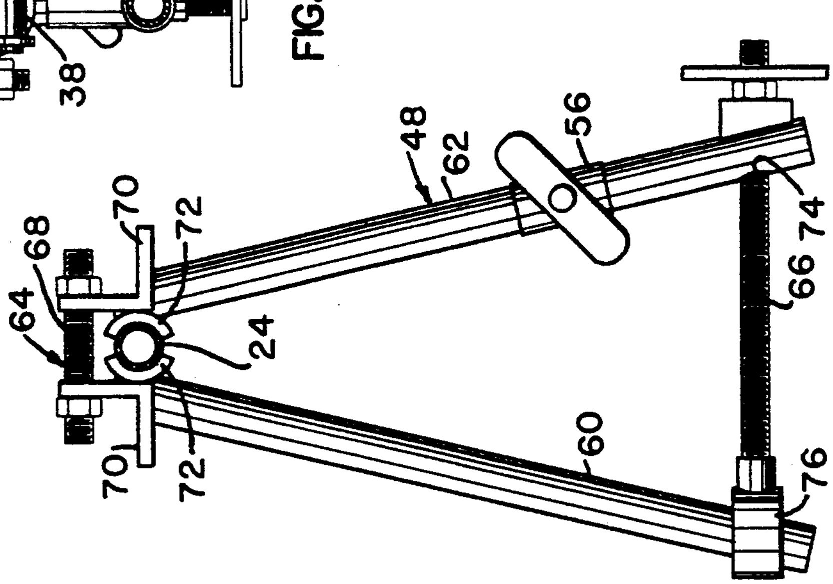
FIG. 2 is a vertical elevational view, generally as shown by the cutting plane shown as Section-line X—X of FIG. 1.
Figure 8:
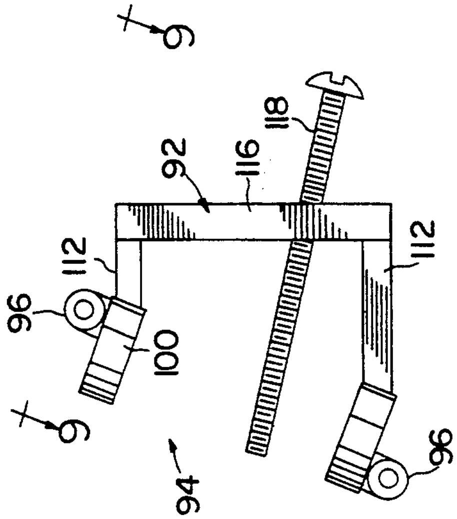
FIG. 8 is a detail view showing the holding bolt in the subassembly having two of the guide bodies as per FIGS. 6 and 7.
Figure 9:
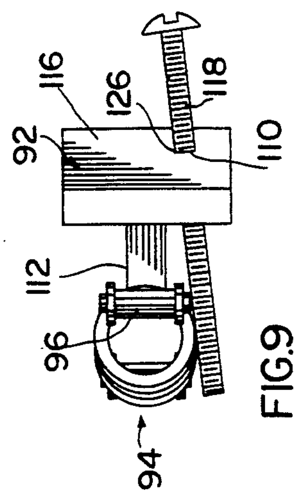
FIG. 9 is a detail view, taken generally as indicated by the view-line 9—9 of FIG. 8.
Figure 6:
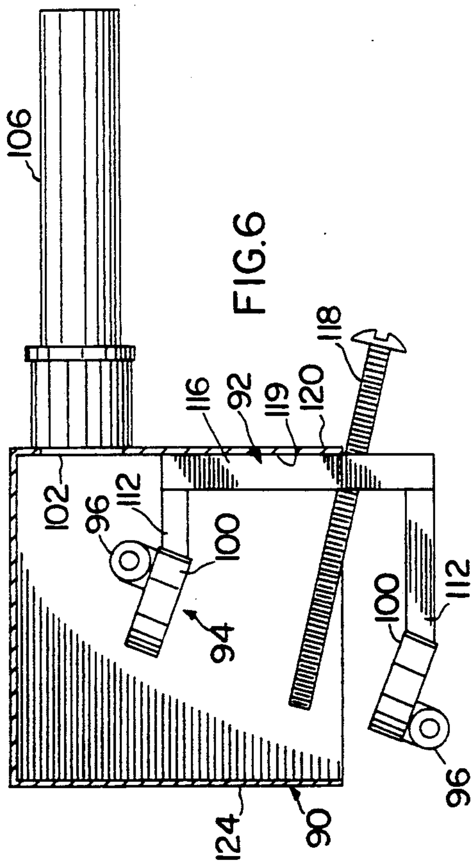
FIG. 6 is a view of a second embodiment of the invention, in which the wire (FIG. 7) is to be guided through a switch box to an associated conduit; and a retainer bolt is in non-holding or withdrawn position.
Figure 7:
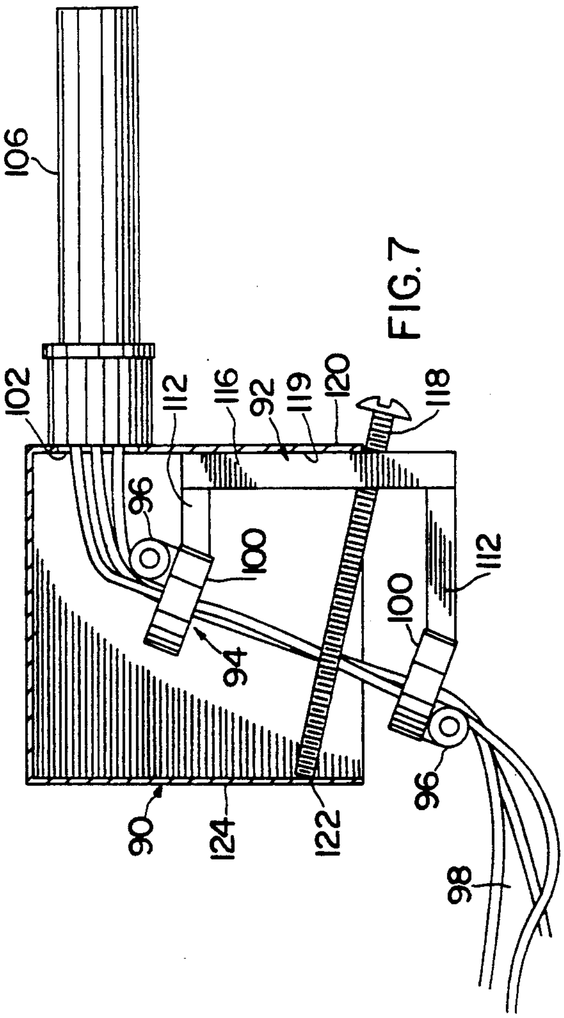
FIG. 7 is a view according to FIG. 6, except that FIG. 7 shows the cable wires being guided through the switch box of FIG. 6, the wire-pull being rightwardly in this view; and the retainer bolt is in its holding position.

That is, in FIGS. 1 and 2, the support 48 is shown by two vertical legs 60 and 62 with bolt means 64 and 66. The bolt means 64 has not only a bolt 68 but support bodies 70 connected to the clamp jaws 72 which embrace the conduit 24; and the fourth support body 48 of FIGS. 1 and 2 is clampable onto the conduit 24 by selective tightening of the bolts 66 and 68, the bolt 66 having a slidable fit in hole 74 of one of the support legs 62, and the bolt 66's other end having a collar 76 slidably assembled onto the support leg 60.

Figure 5:
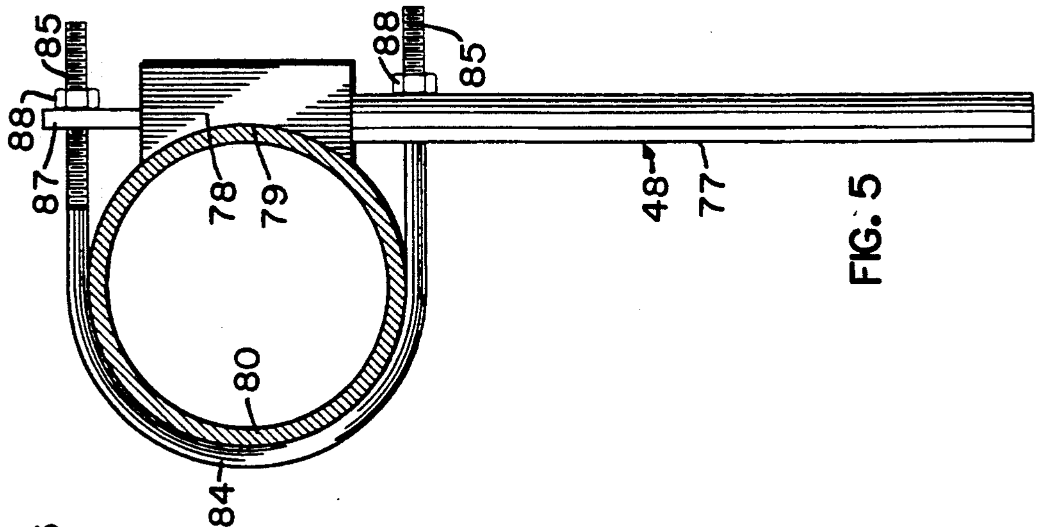
FIG. 5 is a fragmental detail view, generally according to that of FIG. 4, except that the large conduit is connected to the wire guide's support arm by a U-shaped rod threaded at both ends.
Figure 4:
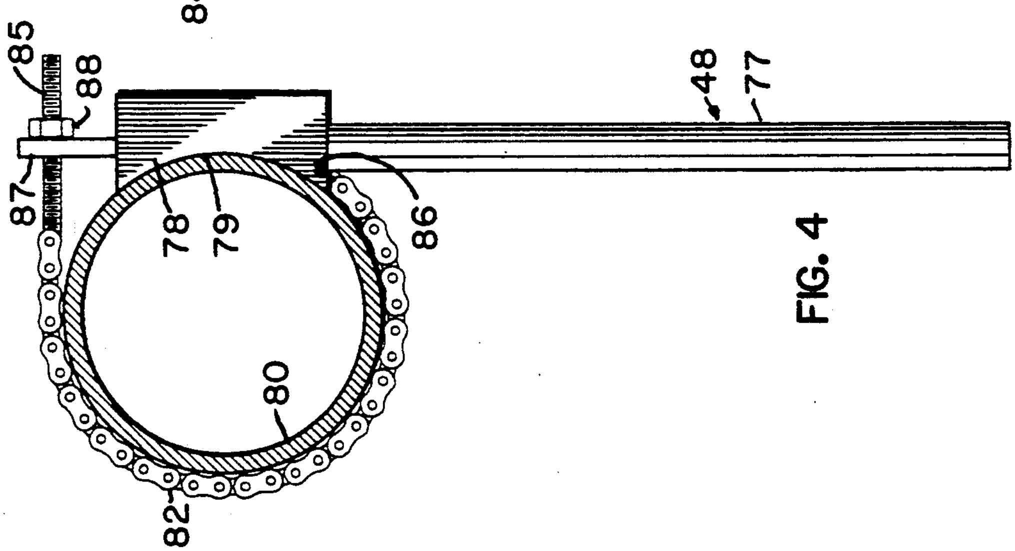
FIG. 4 is a fragmental detail view illustrating the connection of a large (cross-section) conduit which is connected to the support arm for the guide's body by a flexible chain.

In the fourth support body 48 of FIGS. 4 and 5, the vertical support is by only one leg 77 in contrast to the two legs 60 and 62 of FIG. 2; and the leg 77 is shown carried by a support bracket of a U-channel or C-channel form 78 which has a curved surface 79 shown shaped so as to conform to the shape of a conveniently accessable support body 80 which may be the conduit through which the wire 20 passes. Except for the connection of the support arms 48 (77) of FIGS. 4 and 5 to the support tube 80, the bars 77 provide what is referred to as the fourth body member 48, which, as in the embodiment of FIGS. 1 and 2, supports a guide body 26 by a third body member 46.

More particularly, in the embodiment of FIGS. 4 and 5, respectively, the connection of bars 77 to the support tube 80 is by a wrap-around member such as a chain 82 (FIG. 4) or a U-bolt 84 (FIG. 5), each of those members 82 and 84 having at least one screw-threaded end 85 for providing for assembly, disassembly, and adjustability both rotationally and axially of the support tubing 80. One end 86 of the chain 82 is shown (FIG. 4) as connected to the support bracket 78 as by weld 86; and, in both FIGS. 4 and 5, the threaded end 85 of the wrap-around member 82/84 passes through a hole in an extension arm 87 of the rod 77, with the holding nuts shown as 88.

As an alternative holding of the fourth body member 48, FIG. 1 shows it held to the conduit 24 by a bolt 89 passing through the L-shaped support body 70.

V.b. A Second Embodiment

The embodiment shown in FIGS. 6–9 provides special advantage when the electric box 90 is too small or otherwise difficult to be used with the invention of the first embodiment of FIGS. 1–5.

More particularly, in the second embodiment (FIGS. 6–9) the invention provides a rigid bracket 92 which in the form shown carries two of the guide bodies 94, each of which carries a roller 96, which are used to guide the cable or wire 98 through the electric switch box 90.

The guide bodies 94 are shown as of unequal length or size, providing that the bracket 92 may be inserted into the switch box 90, with the axis of the guiding head 100 of at least one of the bodies 94 presenting its roller 96 closely adjacent the box outlet or inlet 102 through which the wire or cable 98 must pass.

That is, with the axis of the roller 96 transverse to the path of the cable 98, and as in the first embodiment, roller 96 provides a smooth and supported curvature for the wire 98 in passing through the box opening 102, and in general concentricity to the axis of the conduit 106.

As to the goal of support of the wire-guide bracket's smooth surface or roller 96, to be operatively adjacent the conduit 106, the similarity, from a concept standpoint, of the Embodiment shown in FIGS. 6–9, in comparison to that of FIGS. 1–5, will be noted in the use of terminology as corresponding to components of those of FIGS. 1–5. That is, with reference to FIGS. 6–10, they show a first body member 100 having a smooth surface (roller 96) along at least a portion thereof for guiding the wire 98 in relation to the conduit 106 being served; and a second body member 112 is shown (similar to second body member 40) for supporting the first body member 100.

Also, a third body member 116 supports the second body member 112; and a bolt 118 is supportedly connected to the third body member 116, the bolt 118 being operatively somewhat similarly to body 48 to receive support from an external support.

Differing, however, from the fourth body member 48 of the first embodiment, the bolt 118 uses the switch box 90 itself in a special way, for support of the bracket 92.

That is, the bolt 118 is threadedly carried by an opening 110 in the third body member 116; and the direction of that carry of the bolt 118, and the length of the bolt 118, is such that with the second body member 112 holding the first body member 100 operatively adjacent the open end 102 of the associated conduit 106 affixed to the associated electric box 90, in a wire-guiding position with respect to the associated conduit's open end 102, and with the third body member 116 also then in abutting contact 119 with a first interior wall 120 of the box, and with the fourth body member (bolt 118) screwed into the third body member 116's hole 110 such that the bolt 118 (fourth body member) is then also in abutting contact 122 with a second interior wall 124 of the box 90, the location of that abutting contact 122 of the bolt 118 and the second interior 124 being substantially spaced from the location of abutting contact 119 of the third body member 116 and the first interior wall 120 of the box, and across the interior of the box 90 therefrom, and if torque is then applied to the bolt 118, in a direction to lengthen the distance between the location 126 of screw-threaded contact of the third body member 116 and the bolt 118 and the location of abutting contact 122 of the bolt 118 and the box' second interior wall 124, the bolt 118 will jam the engagement of the third body member 116 against the box' first interior wall 120 sufficiently to maintain the operative adjacency of the first body member 100 and the conduit's open end 102.

If the smoothness of operativity of the rollers (38 and 96 respectively) is not needed, the guide heads (34 and 100 respectively) of ring-like shape may be found suitable if the inner edge of the rings is sufficiently smooth.

Both embodiments as shown in the drawings show a concept of a pair of guides 26 and 92 carried by a single third body member 46 and 116; and the use of both of those guide devices 26 and 92 may sometimes be advantageously used, with one being at the entrance of an associated box 22 or 90 and one at the outlet, or have any other plural-support installation as may be needed.

VI. CONCLUSION

It is thus seen that a wire-feeding device, as provided and used according to the inventive concepts herein set forth, provides novel concepts of a desirable and advantageous device, yielding the advantages of facilitating wire-feed into conduit, having advantageous details and features, which, in overall combination, is conceptually different from the prior art articles even though devices embodying certain of the mechanical details as a basic capability have, of course, been known for years; yet significantly this particular combination, even considered as including or building on prior art concepts, has not been suggested by the prior art, this achievement being a substantial and advantageous departure from prior art, all this even though the prior art has had the problem of wire-insulation scraping for many years. And particularly is the overall difference from the prior art significant when the non-obviousness is viewed by a consideration of the subject matter as a whole, as integrally incorporating a combination of features as different from the prior art, in contrast to merely those details of novelty themselves, and further in view of the prior art teaching away from the particular and inter-related concepts and features of the present invention.

In summary as to the nature of these advantageous concepts, their inventiveness is shown by novel features of concept and construction shown here, in novel and advantagous combination, not only being different from all the prior art known, but because the achievement is not what is or has been suggested to those of ordinary skill in the art, especially realistically considering this as comprising components which individually are similar in nature to what is well known in the art of manufacture of components of electric circuitry installations, for many years. No prior art has suggested the modifications of any prior art to achieve the novel concepts here achieved, with the various features providing their own functions in the overall combination; and this is particularly significant since devices for facilitating wire-feeding into a conduit are objects whose mechanisms are easy and apparent to observe, and are not technically sophisticated as to either construction, use, or operative principles.

Accordingly, it will thus be seen from the foregoing description of the invention according to these illustrative embodiments, considered with the accompanying drawings, that the present invention provides new and useful concepts of a novel and advantageous combination wire-feeding device, yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiments, or form or arrangement of parts herein described or shown.

I claim:

1. A wire guide apparatus for use with an associated electrical raceway in which wire is to be installed, the apparatus comprising, in combination:

a first body member having a smooth surface along at least a portion thereof for guiding the wire in relation to the raceway, a second body member for supporting the first body member, a third body member for supporting the second body member, and a fourth body member which supports the third body member, and connection means which are connectable to the fourth body member and to an available existing support member of the structure in which the raceway is installed, thereby achieving the support of the first body member;

the connection means being such as to provide full stability to the first body member, through the second, third, and fourth body members, without requirement of any support (a) from any force provided by the wire travelling past the guide or (b) from the floor, and providing that the first body member will be stably supported, upstream of the raceway into which the wire is being installed, thereby to provide the wire-guiding effect of the guide apparatus.

2. The invention as set forth in claim 1, in a combination in which the first body member is comprised of a member selected from the class of a ring member, roller, and other rounded edge surface, and a combination thereof, to provide the first body member to have the smooth surface.

3. The invention as set forth in claim 1, in a combination which provides support means for supporting the first body member in a position such that the first body member's smooth surface is disposed transversely to the raceway into which the wire travel is guided.

4. The invention as set forth in claim 1, in a combination in which the second body member is provided with adjustable connection means such that the second body member is adjustable longitudinally and laterally with respect to the axis of the third body member.

5. The invention as set forth in claim 1, in a combination in which the third body member is provided with adjustable connection means such that the third body member is adjustable longitudinally and laterally with respect to the axis of the fourth body member.

6. The invention as set forth in claim 2, in a combination which also provides support means for supporting the first body member in a position such that the first body member's smooth surface is disposed transversely to the raceway into which the wire travel is guided.

7. The invention as set forth in claim 2, in a combination in which the third body member is provided with adjustable connection means such that the third body member is adjustable longitudinally and laterally with respect to the axis of the fourth body member.

8. The invention as set forth in claim 3, in a combination in which the third body member is provided with adjustable connection means such that the third body member is adjustable longitudinally and laterally with respect to the axis of the fourth body member.

9. The invention as set forth in claim 4, in a combination in which the third body member is provided with adjustable connection means such that the third body member is adjustable longitudinally and laterally with respect to the axis of the fourth body member.

10. The invention as set forth in claim 1, in a combination in which the connection means which connects the fourth body member to the available existing support means comprises a wrap-around member for passing around the available existing support body, with connection means for holding the wrap-around member to the fourth body member by connection of spaced portions of the wrap-around member to the fourth support member.

11. The invention as set forth in claim 10, in a combination in which the wrap-around member comprises a flexible chain.

12. The invention as set forth in claim 10, in a combination in which the wrap-around member comprises a U-bolt.

13. The invention as set forth in claim 10, in a combination in which the wrap-around member comprises a flexible member.

* * * * *